United States Patent
Heusel

(10) Patent No.: US 9,586,288 B2
(45) Date of Patent: Mar. 7, 2017

(54) SHEET METAL BLANK AND METHOD FOR PRODUCING A SHEET METAL COMPONENT HAVING A LASER-WELDING-COMPLIANT TRIANGULAR CORNER

(71) Applicant: TRUMPF Werkzeugmaschinen GmbH + Co. KG, Ditzingen (DE)

(72) Inventor: Joerg Heusel, Stuttgart (DE)

(73) Assignee: TRUMPF Werkzeugmaschinen GmbH + Co. KG, Ditzingen (DE)

( * ) Notice: Subject to any disclaimer, the term of this patent is extended or adjusted under 35 U.S.C. 154(b) by 321 days.

(21) Appl. No.: 14/247,719

(22) Filed: Apr. 8, 2014

(65) Prior Publication Data

US 2014/0302340 A1    Oct. 9, 2014

(30) Foreign Application Priority Data

Apr. 9, 2013   (DE) ................. 10 2013 206 183

(51) Int. Cl.

| | |
|---|---|
| B21D 5/00 | (2006.01) |
| B23K 26/24 | (2014.01) |
| B21D 21/00 | (2006.01) |
| B23K 26/38 | (2014.01) |
| B32B 15/01 | (2006.01) |

(52) U.S. Cl.
CPC ............... *B23K 26/24* (2013.01); *B21D 5/00* (2013.01); *B21D 21/00* (2013.01); *B23K 26/38* (2013.01); *B32B 15/01* (2013.01); *Y10T 428/12354* (2015.01)

(58) Field of Classification Search
CPC ...... B21D 5/00; B21D 5/16; Y10T 428/12354
See application file for complete search history.

(56) References Cited

U.S. PATENT DOCUMENTS

| | | |
|---|---|---|
| 2,463,780 A | 3/1949 | Irving |
| 3,127,862 A | 4/1964 | Presnick |
| 8,371,149 B2 | 2/2013 | Vogel |

FOREIGN PATENT DOCUMENTS

| | | |
|---|---|---|
| DE | 1552082 A1 | 1/1970 |
| DE | 19531103 A1 | 2/1997 |
| DE | 102009004798 A1 | 1/2013 |
| ES | 2332849 A1 | 2/2010 |

*Primary Examiner* — Adam Krupicka
(74) *Attorney, Agent, or Firm* — Fish & Richardson P.C.

(57) ABSTRACT

A sheet metal component bent from a sheet metal blank having a triangular corner comprises a first and a second sheet metal member bent along bending lines from a base member to form two edges of the triangular corner. Two outer edges are weldable to each other to form a third edge. A recess extends into the base member, formed by a curved and/or polygonal first and second edge which protrudes towards the first edge. The second edge extends with a projection beyond a straight line defined by the bending line of the first sheet metal member. A projection tip is spaced from the first edge at least by a thickness of the sheet metal. When the sheet metal members are bent the projection is surrounded by the first edge and the recess is at least substantially closed by the projection.

13 Claims, 2 Drawing Sheets

SHEET METAL BLANK AND METHOD FOR PRODUCING A SHEET METAL COMPONENT HAVING A LASER-WELDING-COMPLIANT TRIANGULAR CORNER

CROSS-REFERENCE TO RELATED APPLICATIONS

This application claims priority under 35 U.S.C. §119 to German Patent Application No. DE 10 2013 206 183.8, filed on Apr. 9, 2013. The contents of this priority application are hereby incorporated by reference in their entirety.

FIELD OF THE INVENTION

The present invention relates to a sheet metal component.

BACKGROUND

A sheet metal blank and a bent sheet metal component are disclosed, for example, in DE 10 2009 004 798 A1.

For the laser-welding of cases, hoods or other sheet metal constructions, the components are intended to be constructed in such a manner that the gap tolerance is complied with for the subsequent joining process. For a good welding result with adequate operational reliability, the triangular edges of the sheet metal construction may generally have a gap of a maximum of from 0.1 to 0.2 mm. In addition, the sheet metal members are intended to be constructed so as to overlap by a specific amount. In particular in the region of visible seams, an overlap of at least approximately 70% of the sheet metal thickness is recommended. Accordingly, the component preparation must provide a configuration of the corner which is intended to be taken into account between two bending members of the sheet metal blank forming the base.

Generally in the case of free bending without any additional requirements with respect to subsequent operating steps, at the intersection of the bending lines, for example, a ¾-circular recess is formed by punching having the diameter d. In this instance, the diameter is selected in accordance with the sheet metal thickness t.

From DE 10 2009 004 798 A1, it is already known to provide in the inner corner of the sheet metal blank located between two bending members a wedge-like recess ("free notch", "corner notch") which during the bending operation prevents squeezing and an associated swelling of the bending portion in this region. With this wedge-like recess, the gap width provided between the two bent sheet metal members can be reduced to a small gap dimension, as required for laser-welding of the two sheet metal members or with visible edges with a high level of requirements. However, owing to the narrow geometry thereof, the wedge-like recess can be produced only by laser-cutting. With thin metal sheets and a high number of items, however, punched blanks are more economical than laser blanks so that boxes having a thin wall thickness are currently welded together from a plurality of individual punched components.

SUMMARY

Certain aspects of the present invention relate to a sheet metal component which is bent from a sheet metal blank having at least one triangular corner. Two edges of the triangular corner are formed by a first and a second sheet metal member of the sheet metal blank which are bent from a base member of the sheet metal blank. The third edge of the triangular corner is formed by two outer edges of the two bent sheet metal members which can be welded to each other. The sheet metal blank in the cutting region of the two outer edges has a recess which extends into the base member. Aspects of the invention further relate to a sheet metal blank for bending to form a sheet metal component having at least one triangular corner, and a method for producing a triangular corner of a sheet metal component, which is bent from a sheet metal blank.

Aspects of the present invention described herein can be used to provide a geometry for the recess that can be punched from the sheet metal blank forming the base and a method for producing a triangular edge bent from the sheet metal blank.

The recess of the sheet metal blank opens in the outer edge of the first sheet metal member and is formed in a hook-like manner by a curved and/or polygonal first edge which extends in the first sheet metal member and in the base member in a concave manner and a curved and/or polygonal second edge which extends in the second sheet metal member and in the base member and which protrudes in the direction towards the first edge. The second edge extends with a projection beyond the straight line which is defined by the bending line of the first bending member by a maximum of the sheet metal thickness and the projection tip is spaced apart from the first edge at least by the sheet metal thickness. When the sheet metal members are bent, the projection is surrounded by the first edge and the recess is at least substantially closed by the projection.

The recess is so large that the punching die is not significantly smaller than the sheet metal thickness in cross-section. So that the recess does not result in a hole which can no longer be closed by welding after the bending operation, the recess is closed by the projection to such an extent that the projection and the first edge can be welded to each other or a gap which may still be present between the projection and the first edge is closed by welding. The gap width of such a gap can be a maximum of approximately 0.2 mm. Should the projection tip still protrude beyond the sheet metal component at first, this protrusion is melted away during welding and additionally provides material for closing the gap.

The size of the recess is adapted to the sheet metal thickness and the bending parameters so that, for each sheet metal thickness, a special punching die and punching mold are intended to be provided. The recess can be produced by laser-cutting or by punching. The sheet metal component enables small "laser-welding-compliant" gap dimensions, (e.g., from 0.1 to 0.2 mm), and is particularly suitable for sheet metal thicknesses of from 1 to 2 mm and for the materials S235, X5CrNi18-10 and $AlMg_3$. The invention affords the possibility of also welding punched single-piece boxes with the laser (heat conduction welding). This is more economical than laser blanks with larger batch numbers and thin metal sheets, and in particular with straight cut edges on the components.

In particular in the region of visible seams, it is advantageous when the gap width of a gap provided between the first and the second bent sheet metal member is also a maximum of approximately 0.2 mm and when the two outer edges of the two bent sheet metal members overlap with each other. In this instance, the overlap of the two bent sheet metal members can be at least approximately 70% of the sheet metal thickness of the sheet metal blank.

Advantageously, the first edge of the recess in the sheet metal blank is constructed as a circular arc to enable simple contours with the punching tools.

In a particularly preferred manner, in the sheet metal blank, the projection has two flanks which extend towards each other at an obtuse angle. The projection may rest on the bending line of the second sheet metal member so that the rear projection flank is at least partially formed by the base member and the front projection flank is at least partially formed by the second sheet metal member.

In the sheet metal blank, the straight line which is defined by the bending line of the second sheet metal member typically also extends through the first sheet metal member, whereas the straight line which is defined by the bending line of the first sheet metal member extends outside the second sheet metal member.

In some embodiments, the first edge and the projection surrounded by the first edge and also the two outer edges of the bent sheet metal members are welded to each other, e.g., laser-welded, to form an enclosed corner.

Some embodiments also relate to the sheet metal blank forming the base of the sheet metal component described above.

In some embodiments, a method for producing a triangular corner of a sheet metal component, which corner is bent from a sheet metal blank, has the following method steps:
  providing the above-described sheet metal blank by punching or laser-cutting the recess; and
  bending the two sheet metal members about the bending lines to form the triangular corner;
  preferably additionally welding, in particular laser-welding, the first edge and the projection which is surrounded by the first edge and the two outer edges of the bent sheet metal members.

In some embodiments, a computer program product has control instructions which are adapted for laser-cutting the above-described recess in a sheet metal blank when the program is run on a laser processing machine.

Additional advantages will be appreciated from the claims, the description and the drawings. The features mentioned above and those set out below may also be used individually per se or together in any combination. The embodiments shown and described are not intended to be understood to be a conclusive listing but are instead of exemplary character for describing the invention.

DETAILED DESCRIPTION OF THE INVENTION

Figure 1:
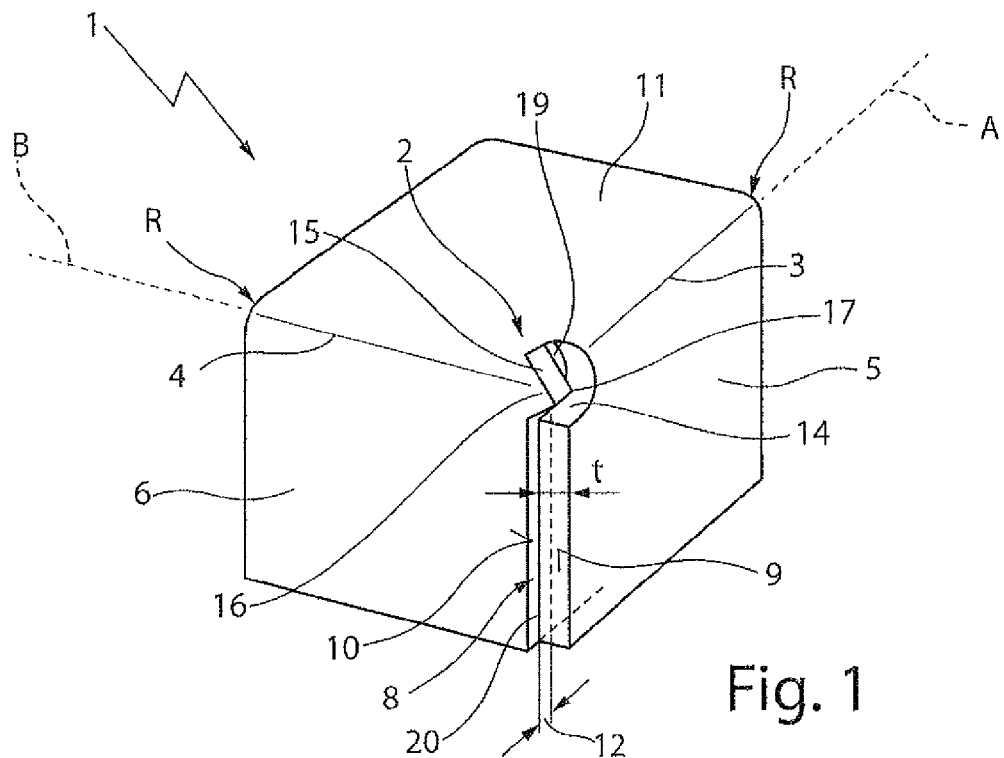
FIG. 1 shows a sheet metal component having a triangular corner.

FIG. 1 shows a sheet metal component 1 having a triangular corner 2, two edges 3, 4 of the corner 2 being formed by a first or a second sheet metal member 5, 6 of a sheet metal blank 7 (FIG. 2), which members are bent through 90°, respectively. The third edge 8 of the corner 2 is formed by the two sheet metal members 5, 6 which are bent so as to overlap with each other. More precisely, the third edge 8 is formed by subsequent laser-welding of the outer edges 9, 10 of the two bent sheet metal members 5, 6. The position of these outer edges 9, 10 is produced from the constructed overlapping of 70% and half of the shortening value (factor by which the sheet metal blank is shortened in advance to compensate for the lengthening of the blank during the bending operation) with respect to the bending line.

The two sheet metal members 5, 6 are bent from a base member 11 of the sheet metal blank 7 by the same inner bending radius R through 90° about the bending lines A and B by free bending. The overlap 12 of the two bent sheet metal members 5, 6 is at least approximately 70% of the sheet metal thickness t of the sheet metal blank 7. If present at all, a gap of the triangular corner 2 between the two bent sheet metal members 5, 6 is a maximum of approximately 0.2 mm.

Figure 2:
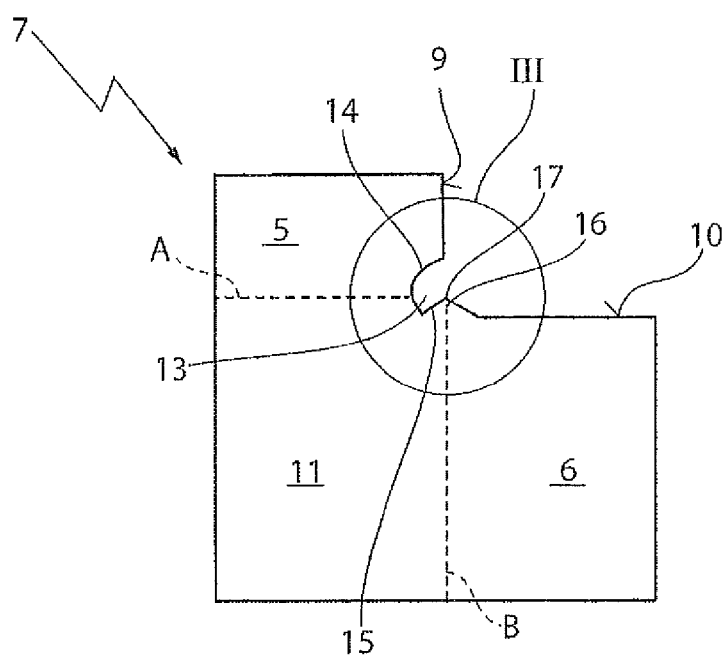
FIG. 2 shows the sheet metal blank from which the sheet metal component shown in FIG. 1 is bent.
Figure 3:
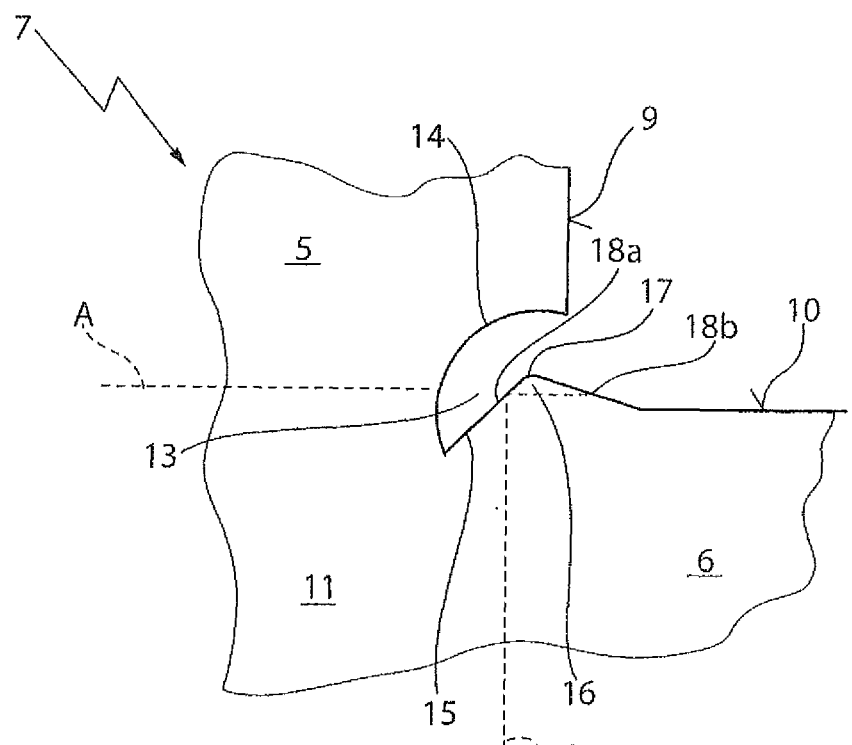
FIG. 3 is a detailed view of a recess of the sheet metal blank according to region III in FIG. 2.

As shown in FIGS. 2 and 3, the flat sheet metal blank 7 has in a cutting region of the two outer edges 9, 10 a recess 13 which extends into the base member 11. The recess 13 opens in the outer edge 9 of the first sheet metal member 5 and is formed in a hook-like manner by a circular-arc-like edge 14 which extends in a concave manner in the first sheet metal member 5 and in the base member 11 and a projection edge 15 which extends in the second sheet metal member 6 and in the base member 11 and which protrudes in the direction towards the circular-arc-like edge 14. The projection edge 15 extends with a triangular projection 16 beyond the straight line defined by the bending line A by a maximum of the sheet metal thickness t, the rounded projection tip 17 being spaced apart from the circular arc edge 14 at least by the sheet metal thickness t. The projection 16 has a rear and a front flank 18a, 18b which extend at an obtuse angle towards each other and meet in the rounded projection tip 17. The straight line defined by the bending line A extends outside the second sheet metal member 6 and with parallel spacing with respect to the outer edge 10. The bending line B terminates at the rear flank 18a of the projection 16, the straight line defined by the bending line B extending inside the first sheet metal member 5 and with parallel spacing from the outer edge 9 thereof.

When the two sheet metal members 5, 6 are each bent through 90° to form the triangular laser-welding corner 2, the projection 16 is also bent through 90° along the bending line B and forms, as shown in FIG. 1, one end of the edge 4. When the sheet metal members 5, 6 are bent, the projection 16 is surrounded by the first edge 14 and the recess 13 is at least substantially closed by the projection 16. In this instance, both the gap width of a gap 19 which is provided between the projection tip 17 and the first edge 14 and the gap width of a gap 20 which is optionally provided between the two outer edges 9, 10 are a maximum of approximately 0.2 mm. These gaps 19, 20 are filled with welding additive (heat conduction welding) to weld them closed. There can be either no gap at all or a gap width not exceeding a maximum of from 0.1 to 0.2 mm.

Figure 4:
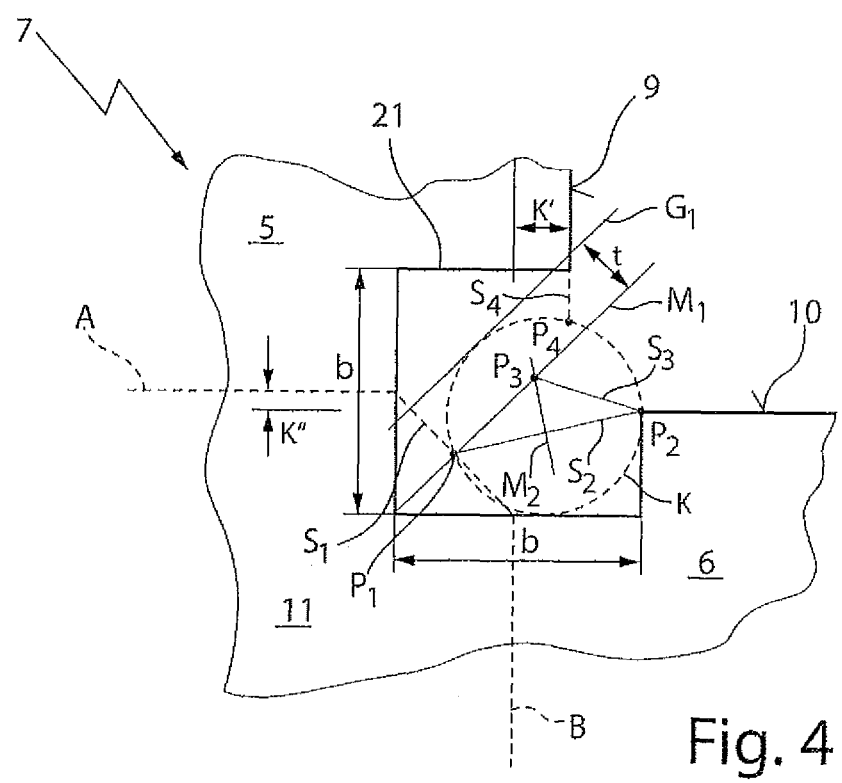
FIG. 4 shows the geometrical construction of the recess shown in FIG. 3.

A computer program product or software can have code or control instructions which are adapted for laser-cutting the above-described recess in a sheet metal blank when the program is run on a laser processing machine. With reference to FIG. 4, the steps of a geometric construction of the recess 13 shown in FIG. 3 are described, with the following peripheral conditions:
  the overlap 12 of the two bent sheet metal members 5, 6 is approximately 70% of the sheet metal thickness t, the gap 20 between the outer edges 9, 10 is smaller than 0.1 mm, the final welding is carried out by heat conduction welding, the position of these outer edges 9, 10 is produced from the constructed overlap of 70% and half of the shortening value with respect to the bending line. The outer edge 9 extends by the dimension K' beyond the bending line B and the outer edge 10 is recessed by the dimension K" behind the bending line A, where K': Sheet metal thickness t−½ bending shortening, K": overlap of 70%−K', K" is dependent on the overlap; at an overlap of 0%, K'=K". Only the prefix is reversed since additions are carried out in the description in each case from the bending line.

Continuing to reference FIG. 4, the steps of a geometric construction of the recess 13 shown in FIG. 3 include:

1. Defining a square 21 in the intersecting bending lines A, B, the square being symmetrical with respect to both bending lines A, B and having a side length b. This side length b is produced from the following formula:

$$b = \frac{2 \times (r_i + t_{Blech})}{\tan\left(\frac{\alpha}{2}\right)} + \Delta x$$

wherer $r_i$ inner bending radius of the sheet metal members 5, 6, $t_{Blech}$ sheet thickness, α bending angle of the sheet metal members 5, 6, Δx shortening factor, by which the sheet metal blank is shortened in advance to compensate for the lengthening of the blank during the bending operation.

2. Connecting the ends of the bending lines A, B ending at the square: Path S1.
3. Centering perpendicular M1 on the path S1.
4. Displacing parallel to the center perpendicular M1 in the direction towards the sheet metal member 5 by the sheet metal thickness t: Straight line G1.
5. Connecting the intersection P1 of S1 and M1 to the outer edge (point P2 on the outer edge 10) of the square on the second sheet metal member 6: Path S2.
6. Centering perpendicular M2 on the path S2.
7. Connecting the intersection P3 of M1 and M2 to the point P2: Path S3.
8. Circling K through P1 and P2 and tangentially on G1.
9. Extending the outer edge 9 of the first bending member 5 by the path S4 as far as the circle K (intersection P4).
10. Forming the circular arc edge 14 with the circle from P4 to P1 and forming the projection edge 15 of the recess 13 with the line P2, P3, P1.
11. Rounding the projection tip P3.

What is claimed is:

1. A sheet metal component bent from a sheet metal blank having at least one triangular corner, the sheet metal component comprising:

a first and a second sheet metal member of the sheet metal blank bent along bending lines from a base member of the sheet metal blank to form two edges of the triangular corner, two outer edges of the first and second bent sheet metal members weldable to each other to form a third edge of the triangular corner, and a recess that extends into the base member in an intersection region of the two outer edges, wherein the recess is formed in the sheet metal blank by a curved and/or polygonal first edge that extends from the outer edge of the first sheet metal member into the first sheet metal member and into the base member in a concave manner, and a curved and/or polygonal second edge that extends in the second sheet metal member and in the base member and that protrudes towards the first edge, wherein the second edge extends with a projection into the recess, and wherein the projection has a projection tip spaced apart from the first edge at least by a thickness of the sheet metal; and wherein the sheet metal members are configured so that when the first and second sheet metal members are bent, the projection is surrounded by the first edge, and the recess is at least substantially closed by the projection.

2. The sheet metal component according to claim 1, wherein a gap width of a gap between the first and the second bent sheet metal member is a maximum of approximately 0.2 mm.

3. The sheet metal component according to claim 1, wherein an overlap of the two bent sheet metal members is at least approximately 70% of the sheet metal thickness of the sheet metal blank.

4. The sheet metal component according to claim 1, wherein the first edge of the recess is constructed as a circular arc in the sheet metal blank.

5. The sheet metal component according to claim 1, wherein the projection has two flanks which extend towards each other at an obtuse angle in the sheet metal blank.

6. The sheet metal component according to claim 1, wherein the projection tip is constructed in a rounded manner in the sheet metal blank.

7. The sheet metal component according to claim 1, wherein the bending line of the second sheet member extends through the projection in the sheet metal blank.

8. The sheet metal component according to claim 1, wherein the straight line which is defined by the bending line of the second sheet metal member extends through the first sheet metal member in the sheet metal blank.

9. The sheet metal component according to claim 1, wherein the straight line which is defined by the bending line of the first sheet metal member extends outside the second sheet metal member in the sheet metal blank.

10. The sheet metal component according to claim 1, wherein the first edge and the projection which is surrounded by the first edge are welded to each other.

11. The sheet metal component according to claim 10, wherein the first edge and the projection, which is surrounded by the first edge and the two outer edges of the bent sheet metal members, are welded to each other.

12. The sheet metal component according to claim 11, wherein the first edge and the projection, which is surrounded by the first edge and the two outer edges of the bent sheet metal members, are laser-welded to each other.

13. A sheet metal blank for bending to form a sheet metal component having at least one triangular corner, the sheet metal blank comprising:

a first and a second sheet metal member configured to be bent along bending lines from a base member of the sheet metal blank to form two edges of the triangular corner, two outer edges of the first and second bent sheet metal members configured to be weldable to each other to form a third edge of the triangular corner, and a recess that extends into the base member in an intersection region of the two outer edges, wherein the recess is formed in the sheet metal blank by a curved and/or polygonal first edge that extends from the outer edge of the first sheet metal member into the first sheet metal member and into the base member in a concave manner, and a curved and/or polygonal second edge that extends in the second sheet metal member and in the base member and that protrudes towards the first edge, wherein the second edge extends with a projection beyond a straight line defined by an extension of the bending line of the first sheet metal member, and wherein the projection has a projection tip spaced apart from the first edge at least by a thickness of the sheet metal, and wherein the sheet metal members are configured so that when the first and second sheet metal members are bent, the projection is surrounded by the first edge, and the recess is at least substantially closed by the projection.

\* \* \* \* \*